United States Patent [19]

Ohtomo et al.

[11] Patent Number: 4,803,645
[45] Date of Patent: Feb. 7, 1989

[54] METHOD AND APPARATUS FOR MEASURING COORDINATES

[75] Inventors: Fumio Ohtomo, Asaka; Hitoshi Otani, Tokyo, both of Japan

[73] Assignee: Tokyo Kogaku Kikai Kabushiki Kaisha, Tokyo, Japan

[21] Appl. No.: 909,254

[22] Filed: Sep. 18, 1986

[30] Foreign Application Priority Data

Sep. 19, 1985 [JP] Japan .................................. 60-207676

[51] Int. Cl.⁴ ...................... G01B 11/14; G01C 11/12; G06F 15/20
[52] U.S. Cl. ...................................... 364/560; 356/2; 356/376; 364/525
[58] Field of Search ................ 364/168, 525, 560–562; 33/504; 356/1, 2, 4, 12, 376, 390; 250/560; 358/3, 92, 146

[56] References Cited

U.S. PATENT DOCUMENTS

| | | | |
|---|---|---|---|
| 3,726,591 | 4/1973 | Helava et al. | 356/2 |
| 4,009,961 | 3/1977 | Maruyama | 356/2 |
| 4,343,553 | 8/1982 | Nakagawa et al. | 356/376 |
| 4,412,799 | 11/1983 | Gates | 356/2 |
| 4,573,191 | 2/1986 | Kidode et al. | 356/12 |
| 4,630,203 | 12/1986 | Szirtes | 356/2 |
| 4,654,872 | 3/1987 | Hisano et al. | 356/2 |
| 4,660,970 | 4/1987 | Ferrano | 356/376 |
| 4,674,869 | 6/1987 | Pryor et al. | 356/376 |
| 4,688,184 | 8/1987 | Taniguti et al. | 356/376 |

Primary Examiner—Parshotam S. Lall
Assistant Examiner—Kevin J. Teska
Attorney, Agent, or Firm—Brumbaugh, Graves, Donohue & Raymond

[57] ABSTRACT

A coordinates measuring method in which the image information of the same point are derived as first, second and third information when viewed from at least three different directions, a first corresponding point is determined by deriving the correlation between the first and second information, and a second corresponding point is determined by deriving the correlation between the second and third information, and mismatching is decided when the first and second coordinates are not substantially coincident with each other.

7 Claims, 9 Drawing Sheets

METHOD AND APPARATUS FOR MEASURING COORDINATES

BACKGROUND OF THE INVENTION

1. Field of the Invention

The present invention relates to a method and an apparatus for measuring coordinates, and more particularly to a method and an apparatus for measuring in a contact-less manner three-dimensional coordinates of a measured point on the object, or three-dimensional coordinates of any desirous measured point in the stereo images.

2. Description of the Prior Art

For example, there is conventionally known a contactless method of measuring three-dimensional coordinates in which corresponding points correspondent to each other are extracted from a pair of stereo photographs and the three-dimensional coordinate values are calculated based on the respective coordinate values of those corresponding points.

The above conventional method of measuring three-dimensional coordinates requires skill and time in extraction of corresponding points from the pair of stereo photographs, respectively. In particular, when the measured object has complicated configuration and many measured points, an operator is much fatigued and must resort to vary in efficient operations.

OBJECT OF THE INVENTION

It is an object of the present invention to provide a method and an apparatus for measuring coordinates in which the measured point is specified for input of only one image data, and corresponding points of other image data are automatically determined through the correlation processing, thereby permitting easier measurement without need of skill.

Another object of the present invention is to provide a method and an apparatus for measuring coordinates in which, when an incorrect corresponding point has been extracted with respect to the measured point specified (hereinafter referred to as "mismatching"), the coordinates measurement on that measured point is ceased to effectively prevent the incorrect measurement due to mismatching.

SUMMARY OF THE INVENTION

According to the present invention, the above and other objects can be accomplished by a coordinates measuring apparatus comprising; a detection unit for deriving image information of the same point as first, second and third information when viewed from at least three different directions; a correlation unit for, letting a measured reference point to be said second information, determining a first corresponding point correspondent to said reference point by deriving the correlation between said first and second information, and a second corresponding point correspondent to said reference point by deriving the correlation between said second and third information; computation means for computing first coordinates based on said reference point and first corresponding point, and second coordinates based on said reference point and second corresponding point; and decision means for making a decision of mismatching when said first and second coordinates are not substantially coincident with each other.

In a preferable aspect of the present invention, said detection unit is composed of three optical systems adapted to form respective images of the measured object as viewed from three different directions in overlapped relation, and three image sensors arranged at respective focus points of the images formed by said three optical systems.

In another aspect of the present invention, said second information is derived as viewed from the direction between two directions in which said first and third information are derived, respectively, and said computation means is adapted to also compute third coordinates as measured coordinates based on said first and second corresponding points.

In another aspect of the present invention, said detection unit has an image sensor and detect said first, second and third information by said image sensor based on at least three photographs taken with a parallax therebetween.

In a further preferable aspect of the present invention, said image sensor is arranged for each of said photographs in one to one correspondence.

According to another aspect of the present invention, the above and other objects can be accomplished by a coordinates measuring method comprising: a first step of deriving image information of the same point as first, second and third information when viewed from at least three different directions; a second step of letting a measured reference point to be said second information; a third step of determining a first corresponding point correspondent to said reference point by deriving the correlation between said first and second information; a fourth step of determining first coordinates based on said reference point and first corresponding point; a fifth step of determining a second corresponding point correspondent to said reference point by deriving the correlation between said second and third information; a sixth step of determining second coordinates based on said reference point and second corresponding point; a seventh step of making a decision of mismatching when said first and second coordinates are not substantially coincident with each other; and an eighth step of determining measured coordinates based on any two among said first corresponding point, second point, and reference point.

In another aspect of the present invention, said first step is carried out by deriving the second information as viewed from the direction between two directions in which said first and third information are derived, respectively, and said eighth step is carried out by determining the measured coordinates based on said first and second corresponding points.

The above and other objects and features of the invention will become apparent from the following description of a preferred embodiment taking reference to the accompanying drawings.

PRINCIPLE OF THE INVENTION

Figure 1:
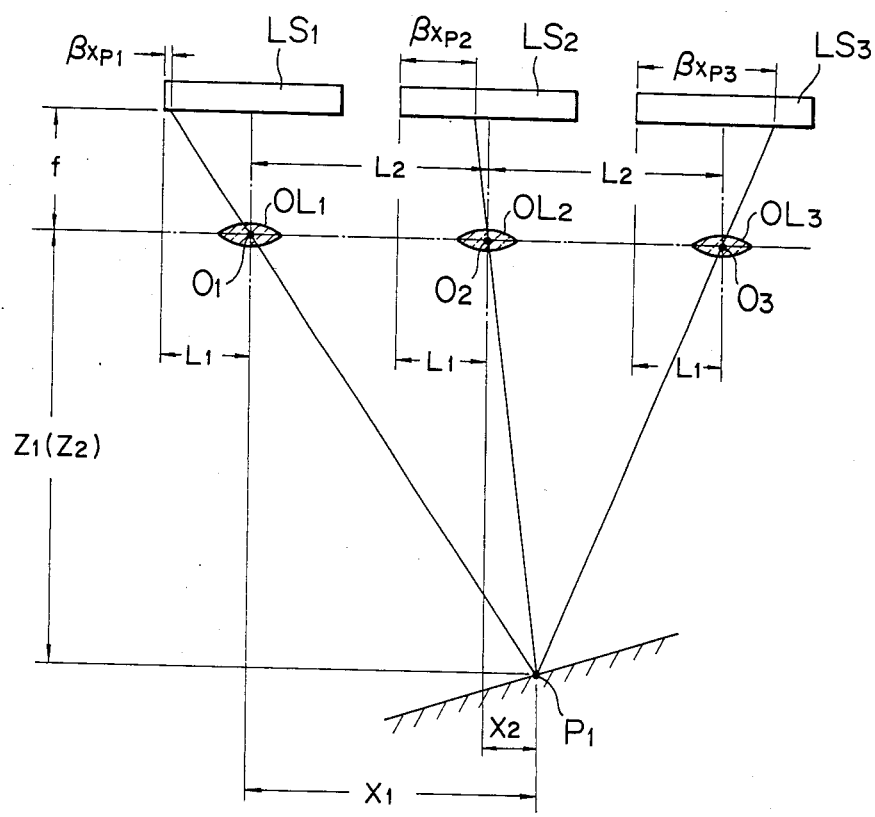
FIGS. 1 and 2 are views for explaining principles of the present invention.

Principles of the present invention will now be described with reference to the drawings. As shown in FIG. 1, an image of a measured point $P_1$ is projected by three object lenses $OL_1$, $OL_2$ and $OL_3$ onto linear image sensors $LS_1$, $LS_2$ and $LD_3$, respectively. Let it be assumed that an interval of adjacent constituent detection elements for each of the linear image sensors $LS_1$, $LS_2$, $LS_3$ is $\beta$, a center-to-center interval between the object lenses $OL_1$ and $OL_2$ and between the object lenses $OL_2$ and $OL_3$ is $L_2$, and an interval between the object lenses $OL_1$, $OL_2$, $OL_3$ and the linear image sensors $LS_1$, $LS_2$, $LD_3$ is f.

It is also assumed that coordinate values of the measured point $P_1$ be given by $(X_1, Z_1)$ in a coordinate system $O_1$ with the center of the object lens $OL_1$ defined as the origin, and coordinate values of the measured point $P_1$ be given by $(X_2, Z_2)$ in a coordinate system $O_2$ with the center of the object lens $OL_2$ defined as the origin. It is further assumed that, letting respective constituent detection elements of each of the linear image sensors $LS_1$, $LS_2$, $LS_3$ to be designated at $UP_{p1}$, $US_{p2}$, . . . beginning with the leftmost one, the respective constituent detection elements $US_{p1}$ of the linear image sensors $LS_1$, $LS_2$, $LS_3$ are spaced from the centers of the object lenses $OL_1$, $OL_2$, $OL_3$ by a distance $L_1$ in the direction of X-axis.

The coordinate values $(X_1, Z_1)$ can be drived from outputs $X_{p1}$, $X_{p2}$ of the linear image sensors $LS_1$, $LS_2$ using the above-defined symbols as follows:

$$X_1 = f_1(X_{p1}, X_{p2}) = \frac{L_1 - \beta \cdot X_{p1}}{\beta(X_{p2} - X_{p1})} \cdot L_2 \quad (1)$$

$$Z_1 = g_1(X_{p1}, X_{p2}) = \frac{f}{\beta(X_{p2} - X_{p1})} \cdot L_2 \quad (2)$$

Likewise, the coordinate values $(X_2, Z_2)$ can be derived from outputs $X_{p2}$, $X_{p3}$ of the linear image sensors $LS_2$, $LS_3$.

$$X_2 = f_1(X_{p2}, X_{p3}) = \frac{L_1 - \beta \cdot X_{p2}}{\beta(X_{p3} - X_{p2})} \cdot L_2 \quad (3)$$

$$Z_2 = g_1(X_{p2}, X_{p3}) = \frac{f}{\beta(X_{p3} - X_{p2})} \cdot L_2 \quad (4)$$

Subsequently, the coordinate values thus derived are subjected to calculations to confirm whether or nor the following equations (5) and (6) are met.

$$X_1 = X_2 + L_2 \quad (5)$$

$$Z_1 = Z_2 \quad (6)$$

If the equations (5) and (6) are met, it is judged that the image data given by the outputs $X_{p1}$ and $X_{p3}$ of the linear image sensors $LS_1$, $LS_3$ represent correct corresponding points, respectively. Coordinate values $(X, Z)$ of the measured point $P_1$ in the coordinate system $O_1$ with the center of the object lens $OL_1$ defined as the origin are derived from the outputs $X_{p1}$, $X_{p3}$ of the linear image sensors $LS_1$, $LS_3$ as follows:

$$X = f_2(X_{p1}, X_{p3}) = \frac{L_1 - \beta \cdot X_{p1}}{\beta(X_{p3} - X_{p1})} \cdot 2L \quad (7)$$

$$Z = g_2(X_{p1}, X_{p3}) = \frac{f}{\beta(X_{p3} - X_{p1})} \cdot 2L \quad (8)$$

Figure 2:
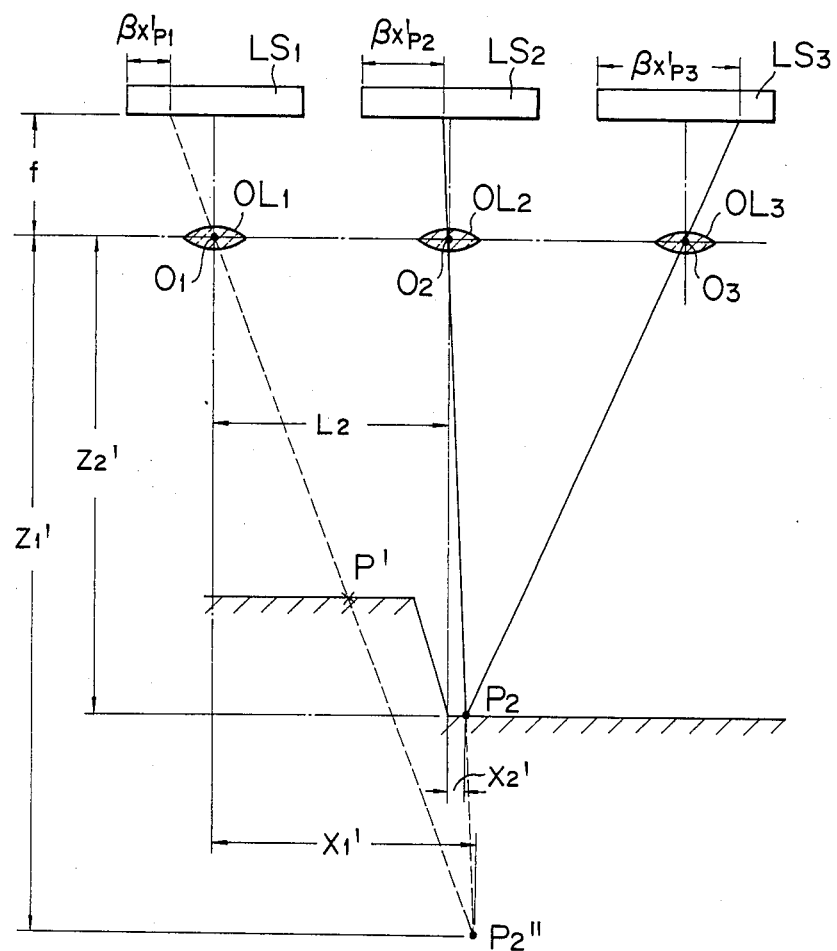

Meanwhile, FIG. 2 shows a case of mismatching where a measured point $P_2$ is specified, but it locates in an occlusion as viewed from the linear image sensor $LS_1$. When some point $P'$ is analogous to the measured point $P_2$ on the image data, the linear image sensor $LS_1$ detect the point $P'$ as a measured point, while the linear image sensor $LS_2$ detects the measured point $P_2$ as a measured point. Accordingly, a measured point $P''_2$ based on outputs $X'_{p1}$, $X'_{p2}$ of the linear image sensors $LS_1$, $LS_2$ is given by coordinates $(X'_1, Z'_1)$ of a point at which an extension of the straight line $O_1P'$ crosses an extension of the straight line $O_2P_2$. On the other hand, a measured point based on outputs $X'_{p2}$, $X'_{p3}$ of the linear image sensors $LS_2$, $LS_3$ is given by correctly specified coordinates $(X'_2, Z'_2)$.

Accordingly, the equations (5) and (6) are not met as follows:

$$X'_1 \neq X'_2 + L_2$$

$$Z'_1 \neq Z'_2$$

As a result, it is judged that mismatching occurs in this measurement.

DESCRIPTION OF THE PREFERRED EMBODIMENT (Data Reading System)

Figure 3:
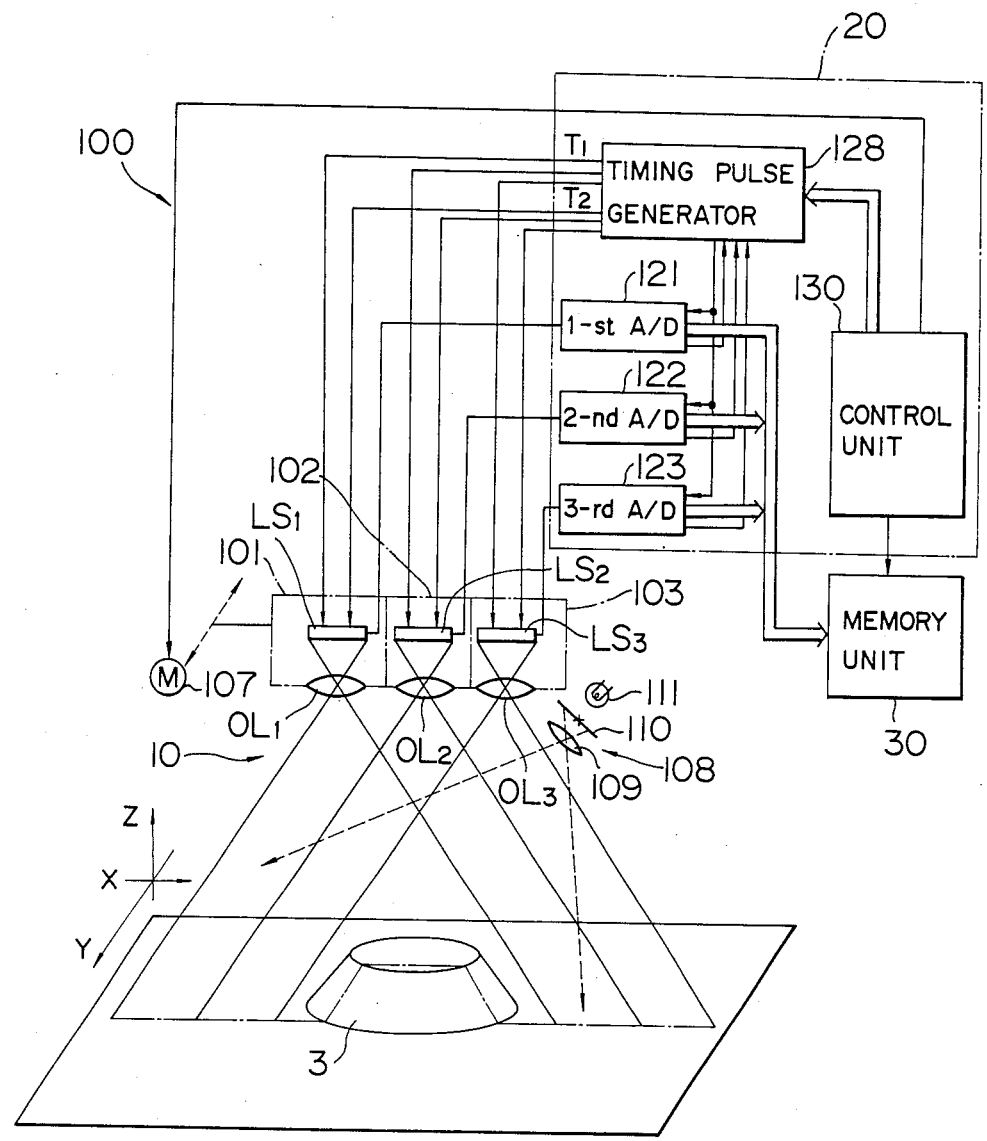
FIG. 3 is a block diagram of a data reading system in a coordinates measuring apparatus according to one embodiment of the present invention.

As shown in FIG. 3, a data reading system 100 is composed of a detection unit 10 comprising optical systems adapted to obtain respective optical images of the measured object 3 and means adapted to detect those optical images in a photoelectrical manner, a control system 20 for receiving and processing the data from the detection unit 10, and a memory unit 30 for storing the data processed by the control system 20.

First, x, y and z coordinates are determined as illustrated in FIG. 3 taking into account a configuration of the object 3. The detection unit 10 includes three object lenses $OL_1$, $OL_2$, $OL_3$ arranged above the object 3 side by side in the direction of x-axis, and three linear image sensors $LS_1$, $LS_2$, $LS_3$ arranged at respective focused points of the object 3 by the object lenses $OL_1$, $OL_2$, $OL_3$ with their detecting directions set in parallel to the direction of x-axis. The sensors $LS_1$, $LS_2$, $LS_3$ and object lenses $OL_1$, $OL_2$, $OL_3$ constitute detectors 101, 102 and 103, respectively, which are movable as an integral unit by a pulse motor 107 in the direction of y-axis.

In the vicinity of the detectors 101, 102 and 103, there is disposed an illumination unit 108 comprising an object lens 109, a pattern film 110 and a light source 111. When the object 3 has no patterns on its surface, the illumination unit 108 is used for projecting on that surface grid, stripe, or other random patterns representative of densities or periods.

The control system 20 includes first, second and third A/D converters 121, 122, 123 for respectively A/D-converting outputs of the sensors $LS_1$, $LS_2$ and $LS_3$ and then delivering the A/D-converted outputs to the memory unit 30, a timing pulse generator 128 for generating timing pulses used to establish the proper time relationship between the sensors $LS_1$, $LS_2$, $LS_3$ and the first to third A/D converters 121, 122, 23, and a control unit 130 for controlling the entire electric system of the apparatus.

(Processing Output System)

Figure 4:
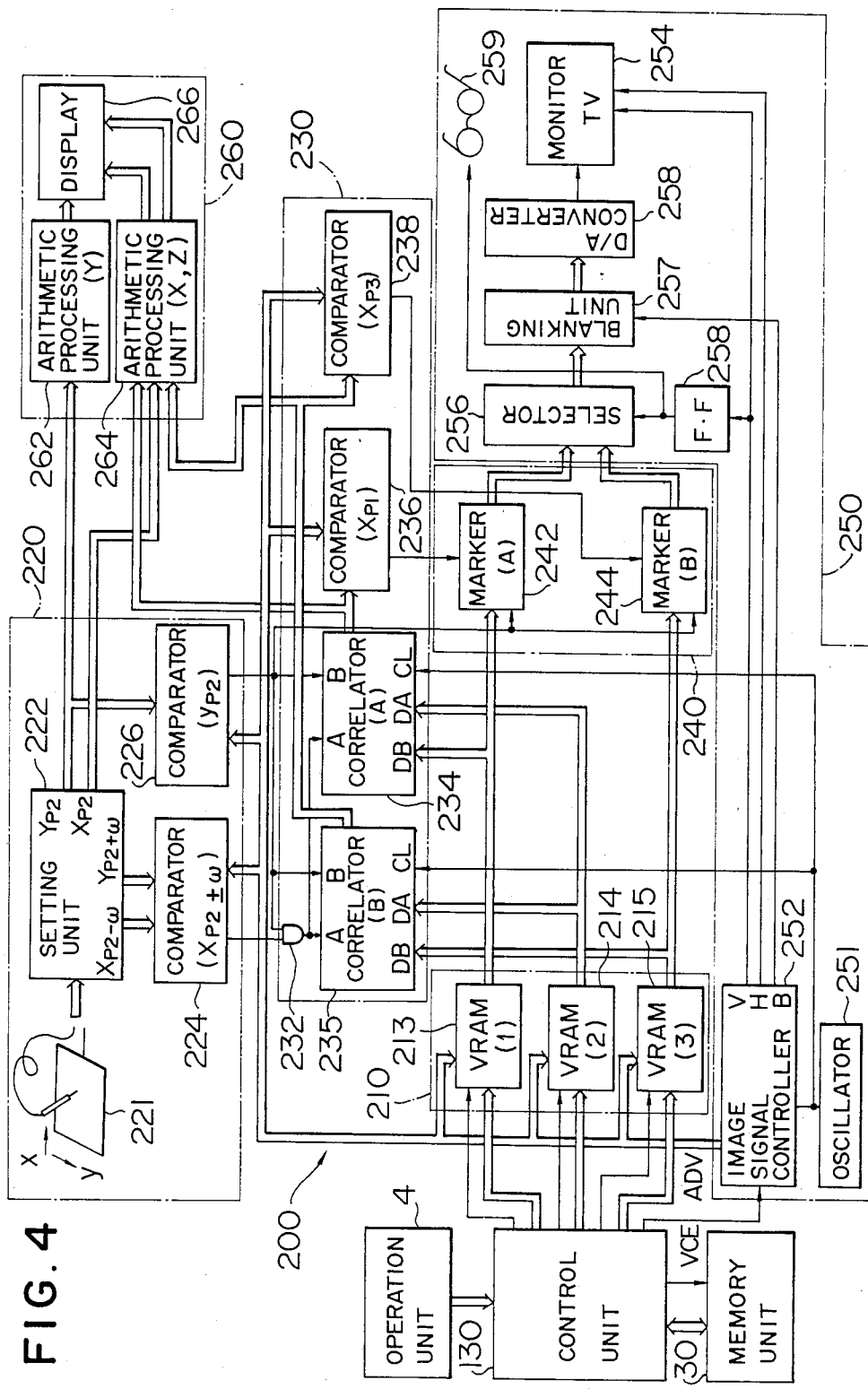
FIG. 4 is a block diagram of a processing output system.

As to a processing output system 200, as shown in FIG. 4, images of the object 3 are alternately displayed on the screen of a monitor TV 254 by using three image data (1), (2) and (3) stored in the memory unit 30, those images are observed by a pair of separation spectacles 259 having a shutter adapted to alternately open and close the left and right visual fields for a three-dimensional view of the object image, and then x, y and z coordinates of an arbitrary measured point on the object 3 are computed and displayed.

As seen from FIG. 4, the processing output system 200 is constituted by a memory unit 210 for storing the image data (1), (2) and (3) to form stereo images, a measured point setting unit 220 for setting a measured point based on the image data (2), a correlation unit 230 for deriving through correlation processing respective corresponding points with respect to the measured point based on the image data (1), (2) and (2), (3), a marker unit 240 for adding the measured point mark data to the image data (2) in accordance with the measured point set in the setting unit 220, and for adding the corresponding point mark data to the image data (1), (3) in accordance with the corresponding points derived in the correlation unit 230 so that the added results are output therefrom, an image forming unit 250 for forming images based on the image data (1), (3) delivered from the marker unit 240 and including the corresponding mark data, and a display unit 260 for displaying measured points based on the measured point mark data and the corresponding point mark data. The processing output system 200 thus constituted is controlled by the control unit 130 which is connected to an operation unit 4 for desirous control.

An image signal controller 252 in the image forming unit 250 serves to output a horizontal synchronizing signal H, a vertical synchronizing signal V and a blanking signal B to the monitor TV 254 while receiving an output signal of an oscillator 251, composed of a counter by way of example, as a clock signal, as well as to output address data to image memories VRAM(1) 213, VRAM(2) and VRAM(3) 215 in the memory unit 210 through an address data line ADV, the address data being used for displaying the image data in the VRAM's 213, 215 at predetermined positions on the monitor TV 254. When an inhibition signal is input to the image signal controller 252 from the control unit 130 through a signal line VCE, the image signal controller 252 ceases to output the address data to the VRAM(1) 213, the VRAM(2) 214 and the VRAM(3) 215. Otherwise, it repeatedly outputs the address data to the VRAM(1) 213, the VRAM(2) 214 and the VRAM(3) 215 at all times. Incidentally, the control unit 130 also serves to input those desirous ones out of the image data stored in the memory unit 30 to the VRAM(1) 213, the VRAM(2) 214 and the VRAM(3) 215 through key-in operations at the operation unit 4.

The output data of the VRAM(1) 213 and the VRAM(3) 215 are input to a selector 256 of the image forming unit 250 through a marker(A) 242 and a marker(B) 244, respectively. The vertical synchronizing signal V of the image signal controller 252 is divided by half in its frequency through a flip-flop 258 and then input to the selector 256, so that outputs from the marker(A) 242 and the marker(B) 244 are alternately delivered to a blanking unit 257 in a switched manner. Therefore, the monitor TV 254 alternately displays the object images based on the image data (1), (3) with such switching operations of the selector 256.

The blanking unit 257 ceases to output the image data for a fly-back time of the monitor TV 254 upon receiving the blanking signal B output from the image signal controller 252, and otherwise it delivers an output of the selector 256 to a D/A converter 258. The D/A converter 258 converts a digital image data signal from the blanking unit 257 to an analog signal and then delivers the latter to the monitor TV 254.

The pair of separation spectacles 259 used by an operator to observe the monitor TV 254 are provided in left and right lens frames with optical shutters formed of liquid crystals by way of example, and these left and right optical shutters are alternately opened and closed with the output of the flip-flop 258 in synchronous relation to the switched images on the monitor TV 254, whereby the object images based on the image data (1), (3) are respectively observed by left and right eyes of the operator to provide him with a three-dimensional view of the object 3.

The measured point setting unit 220 is used for inputting the coordinates $X_{p2}$, $Y_{p2}$ to set the measured point on the monitor TV 254, and an output of a tablet or key-pad adapted to input the coordinates of the measured point is applied to a setting unit 222. The setting unit 222 stores the thus-applied coordinates $X_{p2}$, $Y_{p2}$ of the measured point and then delivers them to a comparator described later, and it also adds the coordinate $X_{p2}$ with window constants $\pm\omega$, that have been previously input thereto and then delivers the resulting values $(X_{p2}+\omega)$, $(X_{p2}-\omega)$ to a comparator 224.

A later-described correlator is adapted to extract from the image data (1), (3) those data series which are analogous to the data series out of the image data (2) substantially representing the measured point, and the window constants ($\pm\omega$) are used to restrict a length of the data series in such extraction.

The comparator 224 receives the address data from the image signal controller 252 and a pair of window constant signals $(X_{p2}+\omega)$, $(X_{p2}-\omega)$ from the setting unit 222, and then generates an output signal when the address data relating to the direction of x-axis is between $(X_{p2}+\omega)$ and $(X_{p2}-\omega)$. A comparator 226 receives the address data from the image signal controller 252 and the coordinate $Y_{p2}$ from the setting unit 222, and then generates an output signal when the address data relating to the direction of y-axis is coincident with $Y_{p2}$.

An AND circuit 232 in the correlation unit 230 generates an output upon receiving output signals from both the comparator 224 and the comparator 226. A correlator(A) 34 receives at its terminal CL the output signal of the oscillator 251 as a clock signal, and also receives at its terminal DA the output data from the VRAM(2) 214 when the output signal of the AND circuit 232 is input to its terminal A.

On the other hand, when the output signal of the comparator 226 is input to its terminal B, the correlator(A) 234 receives at its terminal DB the output data from the VRAM(1) 213. Stated differently, the correlator(A) 234 receives as correlation data both the image data in the row of coordinate $Y_{p2}$ stored in the VRAM(2) 213 and restricted to a range of "$X_{p2} \pm \omega$", and the image data in the row of coordinate $Y_{p2}$ stored in the VRAM(2) 214 and corresponding to a range of one scan. The correlator(A) 234 functions to detect a part of the image data, which is analogous to the image data in a range of ($X_{p2} \pm \omega$) applied to the terminal DA, out of the image data in a range of one scan applied to the terminal DB, and then output a positional signal relating to the position represented by the detected part, that is, the coordinate $X_{p1}$ of a corresponding point correspondent to the coordinate $X_0$ and extracted based on the image data (1), to a comparator 236. Another correlator(B) 235 operates in a like manner so that the coordinate $X_{p3}$ of a corresponding point correspondent to the coordinate $X_0$ and extracted based on the image data (3) is output to another comparator 238.

The comparator 236 in the correlation unit 23 receives a signal of the data $X_{p1}$ applied thereto from the correlator(A) 234 and an address data signal on the direction of x-axis applied thereto from the image signal controller 252, and then generates an output when both the applied signals are coincident with each other, the output being delivered to the marker(A) 242 in the marker unit 240. Upon receipt of the output signals from both the comparators 226 and 236, the marker(A) 242 replaces a part of the output data from the VRAM(1) 213 by mark data before its delivery therefrom. For example, when the maximum value of the image data is less than "FF" in hexadecimal notation, the output data is delivered with its part replaced by mark data set to "FF". In other words, the image data (1) from the VRAM(1) 213 is delivered from the marker(A) 242 as image data (1) including mark data (such as a symbol or bright point) indicative of the measured point.

The comparator 238 receives a signal of the coordinate $X_{p3}$ of a corresponding point correspondent to the coordinate $X_{p2}$ and applied thereto from the correlator(B) 245 and an address data signal on the direction of x-axis applied thereto from the image signal controller 252, and then generates an output when both the applied signals are coincident with each other, the output being delivered to the marker(B) 244. The marker(B) 244 is connected with the comparators 226, 236 and, upon receipt of the output signals from both the comparators 226, 236, replaces a part of the output data from the VRAM(3) 215 by mark data before its delivery therefrom. In other words, the image data (3) from the VRAM(3) 215 is output from the marker(B) 244 as image data (3) including the mark data indicative of a corresponding point.

The image data (1), (3) including mark data and delivered from the markers(A) 243, (B) 244, respectively, are applied to the monitor TV 254 through the selector 256, blanking unit 257 and the D/A converter 258, so that those image data are displayed as images of the object on the monitor TV 252 which images are three-dimensionally observed by means of the pair of separation spectacles 259. At this time, if the coordinates of the measured point detected with outputs of the sensors LS$_1$, LS$_2$ are different from the coordinates of the measured point detected with outputs of the sensors LS$_2$, LS$_3$, i.e., if mismatching is occurred, those measured points would be observed at significantly different levels as compared with difference in level in the vicinity thereof.

The display unit 260 for calculating and displaying the coordinates (X, Y, Z) of the measured point includes an arithmetic processing unit(Y) 262 and another arithmetic processing unit(X, Z) 264. The arithmetic processing unit(Y) 262 receives a signal of the coordinate $Y_{p2}$ from the setting unit 222 and then computes the value of $Y = \alpha \cdot Y_{p2} + Y_0$, where $\alpha$ denotes a pitch of the movement by a pulse motor 107 in the direction of Y-axis and $Y_0$ denotes a position of reference address (e.g., x=0, y=0) of the VRAM(2) 214 in the direction of Y-axis with respect to the origin arbitrarily defined on a table on which the object 3 is placed.

The arithmetic processing unit(X, Z) 264 determines the coordinates X, Z by making use of the equations (1) to (8) as explained in the above section 3E "Principles of the Invention", based on both the coordinate signal $X_{p2}$ applied from the setting unit 222 and the coordinate signals $X_{p1}$, $X_{p3}$ detected by the correlators 234, 235.

Figure 8:
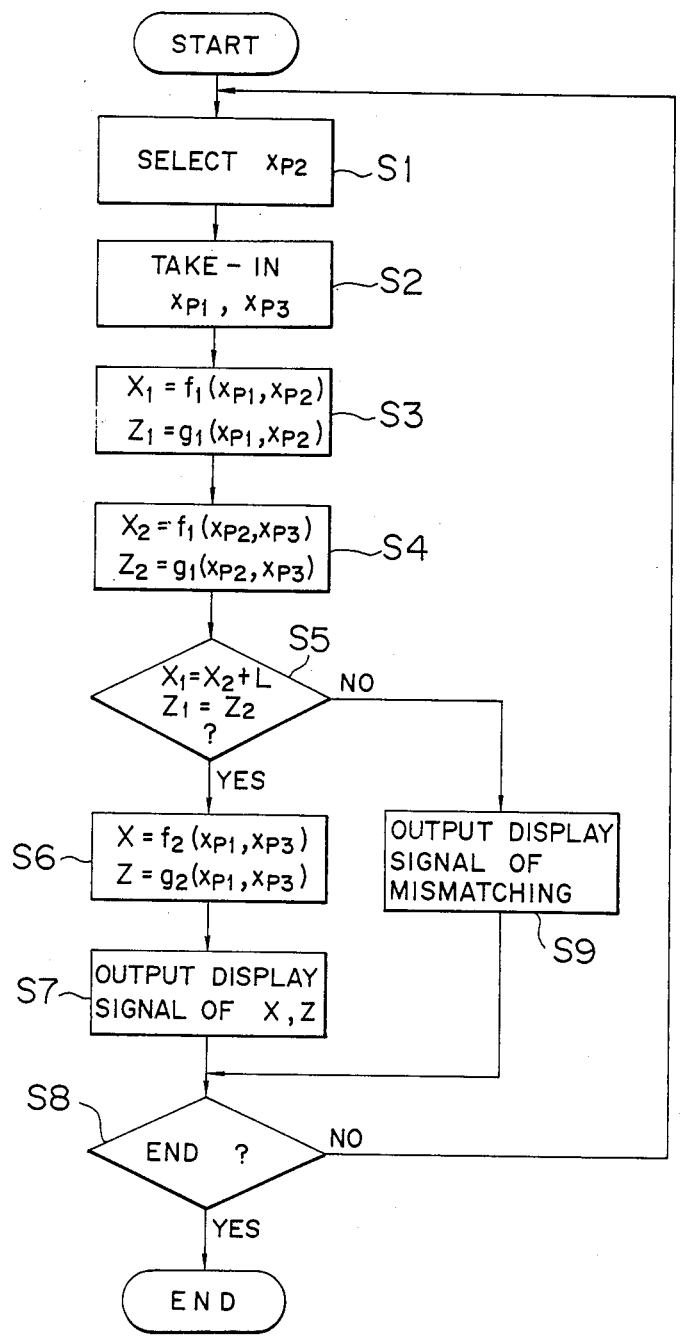
FIG. 8 is a flowchart for an arithmetic processing unit in one embodiment.

Operation of the arithmetic processing units 262, 264 will now be described with reference to a flow-chart shown in FIG. 8. In step S1, the coordinate $X_{p2}$ of a measured point focused on the sensor LS$_2$ is selected by the measured point setting unit 220. In step S2, coordinate signals $X_{p1}$, $X_{p3}$ detected by the sensors LS$_1$, LS$_3$ are taken in. In step S3, the equations (1), (2) are computed based on the outputs $X_{p1}$, $X_{p2}$ of the sensors LS$_1$, LS$_2$ to determine $X_1 = f_1(X_{p1}, X_{p2})$ and $Z_1 = g_1(X_{p1}, X_{p2})$. In step S4, the equations (3), (4) are then computed based on the outputs $X_{p2}$, $X_{p3}$ of the sensors LS$_2$, LS$_3$ to determine $X_2 = f_1(X_{p2}, X_{p3})$ and $Z_2 = g_1(X_{p2}, X_{p3})$. In step S5, it is judged whether or not the equations (5), (6) are both met. If yes, the program proceeds to step S6. In step S6, the equations (7), (8) are computed based on the outputs $X_{p1}$, $X_{p3}$ of the sensors LS$_1$, LS$_3$ to determine $X = f_2(X_{p1}, X_{p3})$ and $Z = g_2(X_{p1}, X_{p3})$. In step S7, display signals of X, Z are output to a display 266. It is judged in step S8 whether or not the operation has been completed and, if no, the program returns to step S1.

If it is judged in step S5 that at least one of the equations (5), (6) is not met, the program proceeds to step S9 where display signal of mismatching is output to the display 266. After that, the program proceeds to step S8.

(Correlator)

The correlators 234, 235 will be described below in detail. Principles of the correlator depends on either an absolute difference method and a correlative coefficient method. Description will now be made on the case that the correlation is determined between a data group $Ax_{pn}$ and a data group $Bx_{pn}$. The absolute difference method is to determine $X_p$, which minimizes $G_1$, while sequentially changing $X_p$, in the following equation.

$$G_1 = \sum_{i=0}^{2\omega} |Ax_p - \omega + i - Bx_{p'} - \omega + i| \quad (9)$$

On the other hand, the correlation coefficient method is to determine $X_p$, at which $G_2$ approaches nearest to "1", while sequentially changing $X_p$, in the following equation, where $Ax_p$, $Bx_p$ denote the mean values.

$$G_2 = \quad (10)$$

-continued $$\frac{\sum_{i=0}^{2\omega} (Ax_p - \omega + i - Ax_p)(Bx_p - \omega + i - Bx_{p'})}{\sqrt{\sum_{i=0}^{2\omega} (Ax_p - \omega + i - Ax_p)^2 \cdot \sum_{i=0}^{2\omega} (Bx_{p'} - \omega + i - Bx_{p'})^2}}$$

Figure 5:
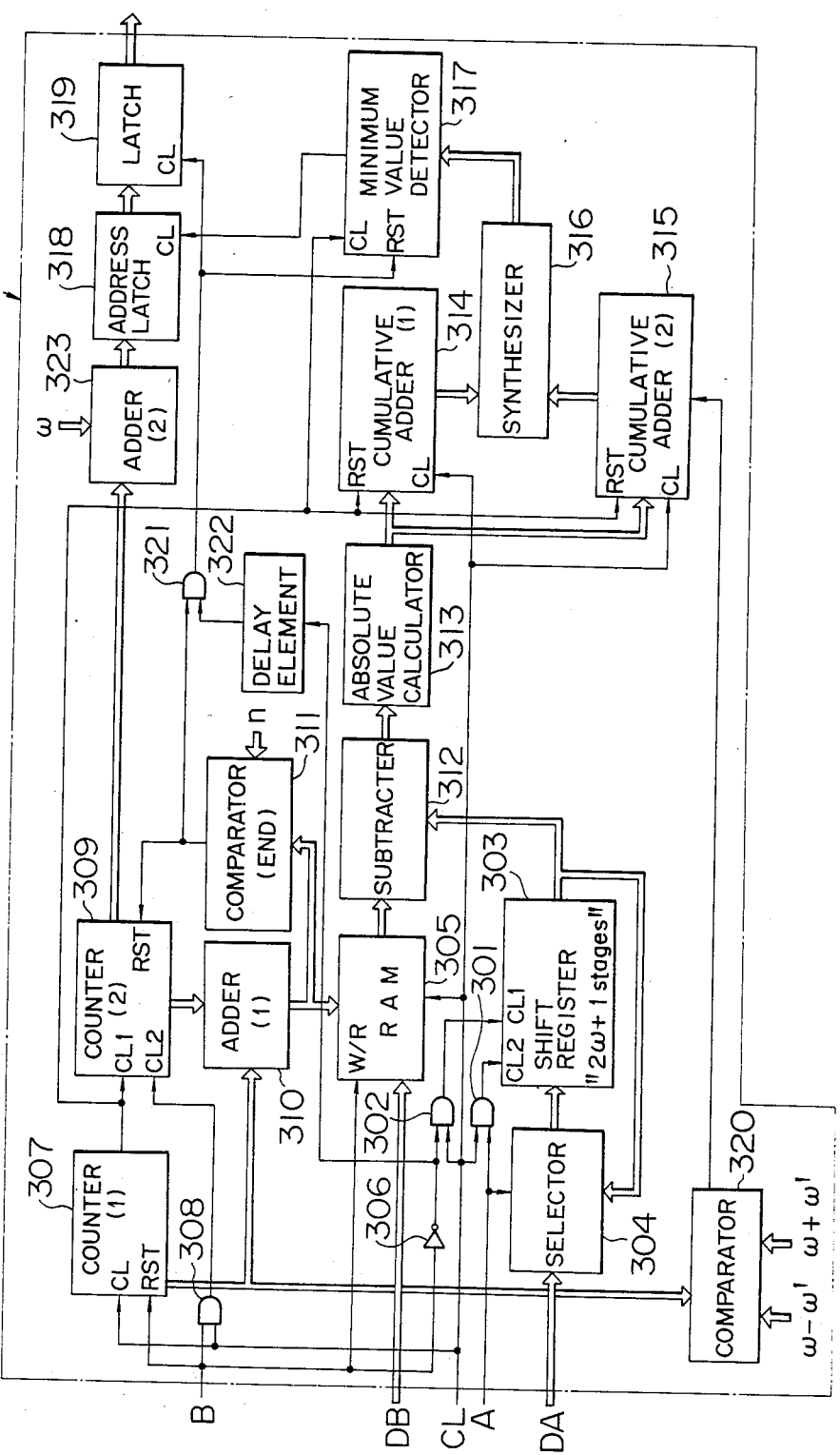
FIG. 5 is a block diagram of a correlator.

The constitution of the correlator 234 resorting to the absolute difference method will now be described with reference to FIG. 5. A terminal A of the correlator 234 to which is applied the output of the AND circuit 232 is connected to an AND circuit 301 and a selector 304, whereas a terminal B thereof to which is applied the output of the comparator 226 is connected to a reset terminal RST of a counter(1) 307, AND circuit 308, RAM 305 and an inverter 306. A terminal DA thereof to which is applied the output of the VRAM(2) 214 is connected to the selector 304, and a terminal DB thereof to which is applied the output of the VRAM(1) 213 is connected to a RAM 305. A terminal CL thereof to which is applied the output of the oscillator 251 is connected to a clock terminal CL of the counter(1) 307, AND circuits 301, 302, RAM 305 and cumulative adders(1), (2) 314, 315.

An output terminal of the counter(1) 307 is connected to a counter(2) 309, cumulative adder(1) 314, minimum value detector 317, cumulative adder(2) 315, adder(1) 310 and a comparator 320. An output terminal of the AND circuit 308 is connected to the counter(2) 309. An output terminal of the inverter 306 is connected to the AND circuit 302 and a delay element 322, whereas outputs of the AND circuits 301, 302 are input to a shift register 303. An output of the selector 304 is applied to the shift register 303, an output of which is applied to the selector 304 and a subtracter 312.

An output of the counter(2) 309 is applied to the adder(1) 310 and an adder(2) 323, and an output of the adder(1) 310 is applied to the RAM 305 and a comparator (END) 11. An output of the comparator (END) 311 is applied to the counter(2) 309 and an AND circuit 321, the AND circuit 321 receiving also an output of the delay element 322.

On the other hand, an output of the RAM 305 is applied to the cumulative adder(1) 314 and the cumulative adder(2) 315 through the subtracter 312 and an absolute value calculator 313. Outputs of the cumulative adder(1) 314 and the cumulative adder(2) 315 are both applied to a synthesizer 316, an output of which is applied to the minimum value detector 317. An output of the AND circuit 321 is applied to a latch 319 and the minimum value detector 317. Further, an output of the adder(2) 323 is applied to the latch 319 through an address latch 318, the address latch 318 receiving an output from the minimum value detector 317. An output of the latch 319 becomes an output of the correlator 234.

In the correlator 234 thus arranged, when the signal is applied from the AND circuit 232 to the terminal A, the clock signal input at the terminal CL is applied to the shift register 303 through the AND circuit 301, and the output data from the VRAM(2) 214 input at the terminal DA are sequentially applied to the shift register 303 through the selector 304. The shift register 303 comprises (2ω+1) stages of shift registers corresponding to the number of data ($X_{p2}+\omega$), each stage including register elements arranged in parallel in number equal to the number of bits constituting each data, so that the data contents are shifted in parallel. On the other hand, when no signals are applied from the AND circuit 232 to the terminal A, the selector 304 is turned over to supply the output data of the shift register 303 to the input of the same. Accordingly, the selector 304 and the shift register 303 now constitutes a ring register.

When the signal is applied from the comparator 226 to the terminal B, the counter(1) 307 is brought into a reset state, the RAM 305 is brought into a write state, and the counter(2) 309 is brought into a counting state while receiving clock signals via the AND circuit 308. More specifically, with the counted value of the counter(1) 307 equal to 0, the RAM 305 directly receives the content of the counter(2) 309 through the adder(1) 310 and then writes the data from the terminal DB in address positions in accordance with the output of the counter(2) 309. The comparator (END) 211 compares the number of data n corresponding to a range of one scan, which are processed for detection of a corresponding point, with the value from the adder(1) 310. If there occurs a coincidence therebetween, the counter(2) 309 is reset.

Incidentally, when the signal is applied from the comparator 226 to the terminal B, the AND circuits 302, 321 are both brought into an inhibition state due to the inverter 306, so that they generate no signals. At this time, the delay element 322 prevents the AND circuit 321 from generating a signal for a delay time given by the counter(2) 309, adder(1) 310 and the comparator (END) 311.

As previously noted, while the address data from the image signal controller 252 relating to the y-axis equal to $y_{p2}$, signals occur at the terminal B and, while the address data relating to the x-axis is within a range of ($X_{p2}\pm\omega$) during such a signal occurrence period, signals occur also at the terminal A. Therefore, the image data corresponding to a range of one scan and locating on the $y_{p2}$ row out of the image data (1) stored in the VRAM(1) 213 are sequentially applied to the RAM 305, whereas the image data corresponding to a range of "$X_{p2}\pm\omega$" and locating on the $y_{p2}$ row out of the image data (2) stored in the VRAM(2) 214 are sequentially applied to the shift register 303.

The completion of occurrence of signals at the terminal B means the start of correlation processing. More specifically, when no signals are applied from the comparator ($y_{p2}$) 226 to the terminal B, the counter(1) 307 starts counting of clock signals, and the aforesaid ring register constituted by the selector 304 and the shift register 303 is operated upon receipt of clock signals with the AND circuit 302 being released from its inhibition state.

Also, the completion of occurrence of signals at the terminal B brings the RAM 305 into a read state, and releases the AND circuit 321 from an inhibition state with a little delay so that an output state of the comparator (END) 311 can be transmitted to the latch 319.

The counter(1) 307 is a counter which completes one cycle with the count of (2ω+1), and it operates in synchronous relation with the ring register. The counted value of the counter(1) 307 represents i in the equation (9), and the correlator 234 computes the value of $G_1$ in the equation (9) for each cycle of the counter(1) 307.

The counted value of the counter(2) represents ($x_{p1}-\omega$) and is incremented by one for each cycle of the counter(1) 307. The adder(1) 310 adds the counted value of the counter(1) 307 with the counted value of the counter(2) 309, and the resulting sum is applied as address data to the RAM 305. Accordingly, the RAM 305 delivers the output data of $B_0, B_1, \ldots, B_{2\omega}$ during a first cycle of the counter(1) 307, the output data of $B_1, B_2, \ldots, B_{2\omega+1}$ during a second cycle thereof, and then the output data of $B_2, B_3, \ldots, B_{2\omega+2}$ during a third cycle thereof. In other words, the output of the RAM 305 is given by a series of data which are shifted by one data sequentially for each cycle of the counter(1) 307.

The shift register 303 repeatedly outputs a series of data $A_0, A_1, \ldots, A_{2\omega}$ for each cycle of the counter(2) 309. The above operation of the counter(1) 307 will be continued until the completion of correlation processing at which the output value of the adder(1) 310 becomes equal to n and the comparator (END) 311 generates an output signal.

The subtracter 312 subtracts the output data of the RAM 305 from the output data of the shift register 303 and then delivers the resulting difference therefrom. When the output data of the subtracter 312 is negative, the absolute value calculator 313 delivers that data after converting it to the positive data.

The cumulative adder(1) 314 is composed of an adder and a latch, and adds the output data of the absolute value calculator 313 sequentially into the latch during one cycle of the counter(1) 307. For convenience of description, it is herein just noted that the synthesizer 316 functions to apply an output of the cumulative adder(1) 314 to the minimum value detector 317, details of the synthesizer being later described.

The minimum value detector 317 is composed of a comparator and a latch. The latch assumes the maximum value (e.g., "FF" in case of 8 bits) when it is in a reset state, and the comparator compares the input data with the content of the latch. If the input data is smaller than the content of the latch, the former is input to the latch and an output signal indicative of a data change in the latch is delivered from the minimum value detector 317 to the address latch 318. An output signal of the counter(1) 307 is supplied to the cumulative adder(1) 314 and the minimum value detector 317, so that the minimum value detector 317 is operated when the output signal is generated for each cycle of the counter(1) 307. Then, when occurrence of the output signal of the counter(1) 307 is ended, the cumulative adder(1) 314 is reset and the output signal of the minimum value detector 317 is ceased.

The address latch 318 is supplied with the value resulted by adding $\omega$ to the counted value of the counter(2) in the adder(2) 323, i.e., the value of $x_{p1} - \omega + \omega = x_{p1}$ because the counted value of the counter(2) 309 is given by $(x_{p1} - \omega)$, and the value of $x_{p1}$ is stored in the latch 319 upon occurrence of the output signal from the minimum value detector 317. Accordingly, the value of $x_{p1}$ which provides lesser $G_1$ is stored in the address latch 318. The output signal of the comparator (END) 311 is supplied to both the latch 319 and the minimum value detector 317 through the AND circuit 321. This causes the content of the address latch 318 to be stored in the latch 319 for its delivery therefrom as output data to the outside of the correlator 234. On the other hand, the minimum value detector 317 is reset to be ready for the subsequent correlation processing.

Meanwhile, as the window width ($2\omega$) used in the correlation processing is increased, the possibility of non-coincidence of the corresponding point to the measured point, i.e., mismatching, is reduced. However, the value of $G_1$ varies gently with changes in $x_{p1}$ and hence the detection sensitivity becomes low. To the contrary, when the window width ($2\omega$) is set narrower, the detection sensitivity is improved, but the possibility of mismatching is increased because of the reduced number of data which are to be used in correlation calculations. To eliminate such a shortcoming, the correlator 234 in this embodiment is so constituted that it employs two or more window widths, and the correlation states derived by using respective windows are synthesized to detect the final corresponding point. To this end, there are employed the synthesizer 316, cumulative adder(2) 315 and the comparator 320 which will be described below.

The comparator 320 generates an output signal when the output value of the counter(1) 307 is within a range of $(\omega \pm \omega')$. When the counted value of the counter(1) 307 is equal to $\omega$, the output of the shift register 303 becomes $x_{p1}$ and, therefore, the counted value of $(\omega \pm \omega')$ represents $(x_{p1} \pm \omega)$ (where $\omega > \omega'$). The cumulative adder(2) 315 carries out cumulative addition only while the comparator 320 is generating its output signal. The synthesizer 316 synthesizes the values of both the cumulative adder(1) 314 and the cumulative adder(2) 315, and then delivers the synthesized result to the minimum value detector 317.

Figure 6:
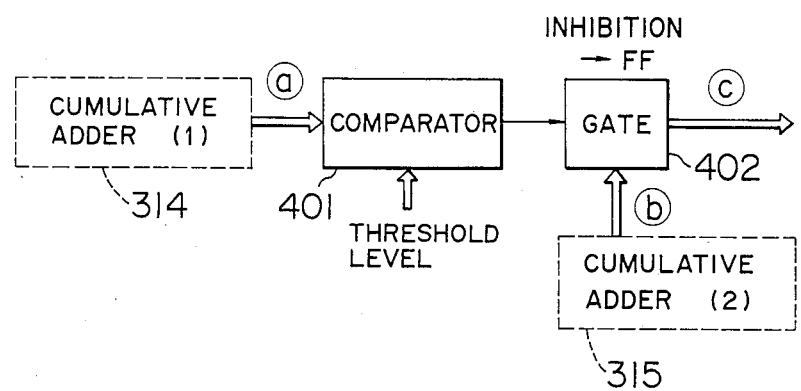
FIG. 6 is a block diagram of a synthesizer in one embodiment.

The synthesizer 316 will now be described in detail. As shown in FIG. 6, the synthesizer of first embodiment is composed of a comparator 401 to which is applied an output of the cumulative adder(1) 314, and a gate 402 to which are applied outputs of the comparator 401 and the cumulative adder(2) 315. The comparator 401 compares the output ⓐ from the cumulative adder(1) 314 with a preset threshold level, as illustrated in FIG. 6. If the output ⓐ from the cumulative adder(1) 314 is smaller, the gate 402 is released to deliver an output ⓑ of the cumulative adder(2) 315 to the minimum value detector 317 as an output ⓒ from the gate. On the other hand, if the output ⓐ is larger than the preset threshold level, the gate 402 is inhibited to deliver the maximum value (e.g., "FF" in case of 8 bits) to the minimum value detector 317 as an output c from the gate.

In case of the synthesizer of first embodiment, therefore, when the larger window width provides a not so good correlation state, it is judged that the smaller window width cannot provide a good correlation state and, hence, the correlation state at the smaller window width is ignored. On the other hand, when the larger window width provides a good correlation state, the corresponding point is detected by making use of the correlation state at the smaller window width because the more accurate correlation processing can be expected.

Figure 7:
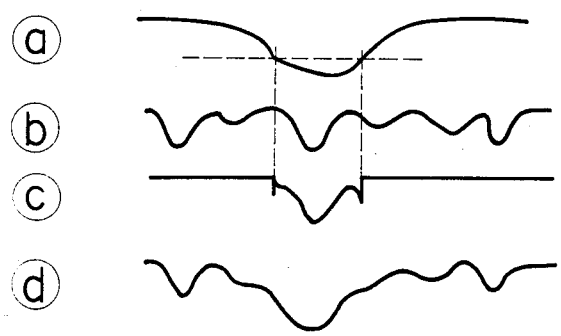
FIG. 7 is a waveform view of the synthesizer of FIG. 6.

As shown in FIG. 7, the synthesizer of second embodiment comprises an adder where an output a of the cumulative adder(1) 314 is added with an output b of the cumulative adder(2) 315, and an added output d is delivered to the minimum value detector 317.

The correlator (B) has a similar construction to that of the correlator (A) except for that the terminal DB of the former receives the output from the VRAM(3) 215 in place of the output from the VRAM(1) 213. For this reason, the detailed description of the correlator (B) will be omitted.

Figure 9:
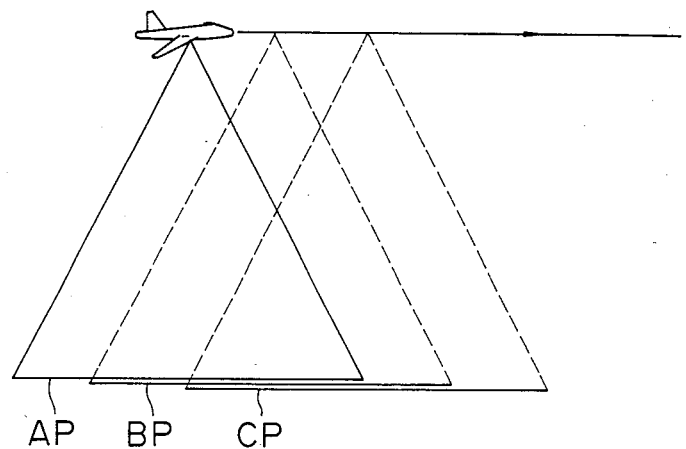
FIG. 9 is a view for explaining the shooting method of aerial photographs used in another embodiment.
Figure 10:
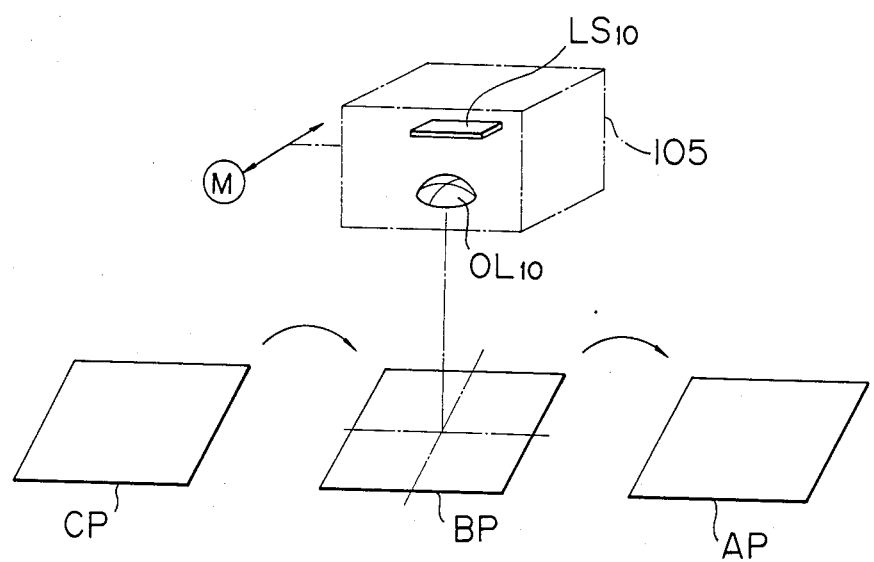
FIGS. 10 and 11 are views for explaining the method of measuring the coordinates by using the aerial photographs.

There will now be described another embodiment which is effective to analyze aerial photographs in accordance with the present invention. Let it be assumed that three aerial photographs AP, BP, CP are taken from different shooting positions, as shown in FIG. 9. In this second embodiment, as illustrated in FIG. 10, a detector 105 is constituted by an object lens $OL_{10}$ and a linear image sensor $LS_{10}$, and the aerial photographs AP, BP, CP are sequentially placed at the focused point of the detector 105 to obtain respective output signals $X_{p1}$, $X_{p2}$, $X_{p3}$.

Figure 11:
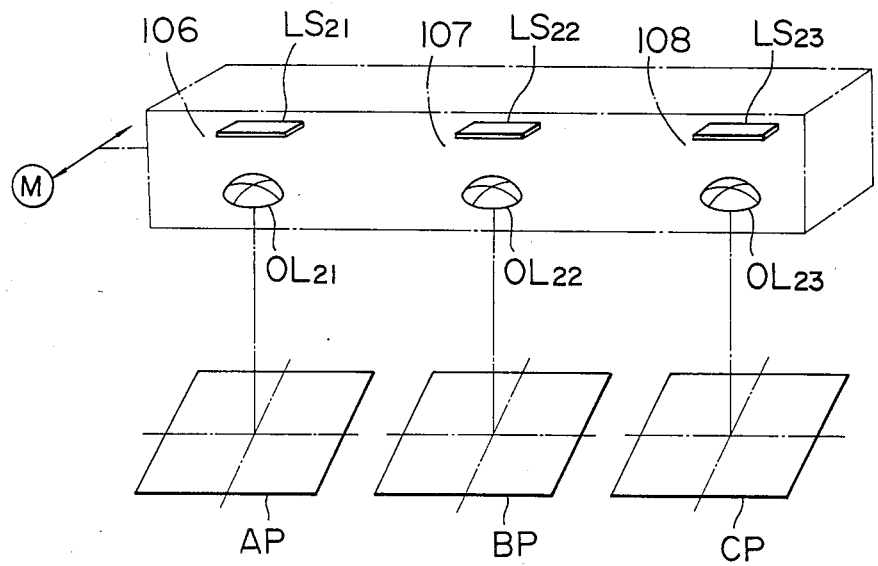

In a modified example of this embodiment, as illustrated in FIG. 11, three detectors 106, 107, 108 are constituted by three object lenses $OL_{21}$, $OL_{22}$, $OL_{23}$ and three linear image sensors $LS_{21}$, $LS_{22}$, $LS_{23}$, respectively, and the aerial photographs AP, BP, CP are placed at the respective focused points of the detectors 106, 107, 108 to obtain respective output signals $X_{p1}$, $X_{p2}$, $X_{p3}$.

According to the present invention thus arranged, since a measure point is required to be specified only for one image data for input of its coordinate values, and corresponding points are not required to be extracted by observation for other image data, there can be attained such an effect that an operator can easily and accurately perform the coordinates measurement with no need of skill.

The present invention also provides such an effect that mismatching caused by the coordinates measuring apparatus can be judged and reliability of the coordinates measurement can be improved by excepting the measured coordinates at mismatching from the measured results.

Further, according to the present invention, since a measured point is specified for the image data of intermediate sight angle out of three image data having different sight angles, and the final coordinates measurement is carried out using other two image data, the image data used for the coordinates measurement provides a larger angle included between their sight directions, thereby permitting the coordinates measurement of high accuracy.

Moreover, the present invention is not limited to indoor measurements in which any random pattern is projected on the object, and it is applicable also to photo survey. In such an application field, there can be attained an effect of effectively improving the survey efficiency and the measurement accuracy in photo survey.

The invention has thus been shown and described with reference to a specific embodiment, however, it should be noted that the invention is in no way limited to the details of the illustrated arrangements but changes and modifications may be made without departing from the scope of the appended claims.

We claim:

1. Apparatus for measuring the coordinates of a point on a three-dimensional object, said apparatus comprising:
   detection means for viewing said object from at least three different directions and deriving three uniquely different kids of image information representative of a point on said object respectively designated first, second and third image information;
   correlation means coupled to said detection means including means for setting said second image information as a measured reference point, means for deriving a correlation between said first image information and said second image information for producing information defining a first correspondent point correspondent to said measured reference point, and means for deriving a correlation between said second image information and said third image information for producing information defining a second correspondent point corresponding to said measured reference point;
   computation means for computing a first signal representing first coordinates of said point from information defining said measured reference point and said first corresponding point, and for computing a second signal representing second coordinates of said point from information defining said measured reference point and said second corresponding point; and
   decision circuit means connected to receive said first and second signals respectively representing said first and second coordinates for determining whether or not said first and second coordinates are substantially in coincidence with each other and for indicating a mismatch when they are not substantially coincident.

2. Apparatus for measuring coordinates according to claim 1, wherein said detection unit comprises three optical systems for forming respective images in overlapped relation of the measured three-dimensional object as viewed from three different directions, and three image sensors arranged at respective focus points of the images formed by said three optical systems.

3. Apparatus for measuring coordinates according to claim 2, wherein said second image information is derived by viewing said object from a direction between two directions from which said first and third image information are respectively derived, and wherein said computation means also computes a third signal representing third coordinates of said measured point from information defining said first and said second corresponding points.

4. Apparatus for measuring coordinates according to claim 1, for detecting said first, second and third image information from image information contained in at least three photographs taken with parallax therebetween.

5. Apparatus for measuring coordinates according to claim 4, wherein said detection unit has an image sensor for each of said photographs arranged in one to one correspondence therewith.

6. A method for measuring the coordinates of a point of a three-dimensional object, said method comprising the steps of:
   viewing said object from three different directions for deriving three uniquely different kinds of image information of said point, designated first, second and third image information;
   designating said second image information as a measured reference point;
   deriving a correlation between said first image information and said second information and producing information defining a first corresponding point correspondent to said measured reference point;
   deriving a correlation between said second image information and said third image information and producing information defining a second correspondent point corresponding to said measured reference point;
   determining first coordinates from information defining said measured reference point and said first corresponding point;
   determining second coordinates from information defining said reference point and said second corresponding point;

determining whether or not said first and second coordinates are substantially coincident with each other and indicating a mismatch when they are not; and upon determining substantial coincidence of said first and second coordinates, determining measured coordinates of said point on the three-dimensional object from information defining any two points among said first corresponding point, said second corresponding point, and said measured reference point.

7. A method for measuring coordinates according to claim 6, wherein said first-mentioned step is carried out by deriving said second information by viewing the object from a direction between the two directions from which said object is viewed to derive said first and third information, respectively, and wherein said last-mentioned step is carried out by determining the measured coordinates based on said first and said second corresponding points.

* * * * *